(No Model.)

F. SCHMALZ.
STRIPPED NEGATIVE.

No. 409,507.  Patented Aug. 20, 1889.

WITNESSES.
Rich'd H. Jones
H. C. Ramsay.

INVENTOR.
F. Schmalz
by Wright Brown Consley
Attys.

UNITED STATES PATENT OFFICE.

FRANÇOIS SCHMALZ, OF NEW YORK, N. Y., ASSIGNOR TO THE AMERICAN WALTHAM WATCH COMPANY, OF WALTHAM, MASSACHUSETTS.

STRIPPED NEGATIVE.

SPECIFICATION forming part of Letters Patent No. 409,507, dated August 20, 1889.

Application filed April 2, 1888. Renewed May 13, 1889. Serial No. 310,686. (No model.)

*To all whom it may concern:*

Be it known that I, FRANÇOIS SCHMALZ, of New York, in the county of New York and State of New York, have invented certain new and useful Improvements in Stripped Negatives, of which the following is a specification.

This invention has for its object to provide a strong and flexible stripped photographic negative, or, in other words, a negative film removed from the glass on which it was made and rendered strong and flexible, so that it can be freely handled and can be curved more or less without danger of cracking or injuring the opaque portions of the negative, and will be sufficiently flexible to conform to convex or other curved surfaces.

The invention consists in a stripped negative secured to a sheet of oiled silk, which is cemented to one side of the negative film, and a thin coating of rubber or rubber and collodion applied to the opposite side of the film.

Figure 1:
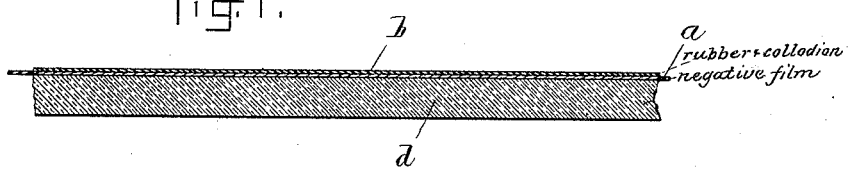
Figure 2:
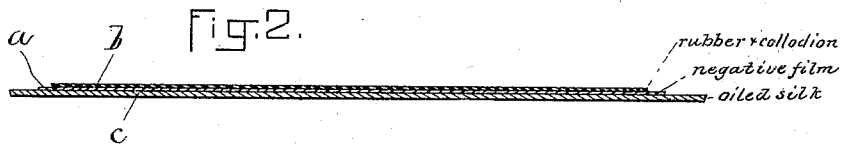

Of the accompanying drawings, forming a part of this specification, Figure 1 represents a sectional view of a negative on a glass plate and a lifting-back on said negative. Fig. 2 represents a sectional view of said negative with a facing of oiled silk.

The same letters of reference indicate the same parts in both of the figures.

In carrying out my invention I make a photographic negative *a* on a piece of glass *d* in the usual manner, and pour upon the film of the negative a thin coating of rubber solution. When said coating has sufficiently hardened, I may pour a coating of collodion on the rubber coating. The aggregate thickness of the two coatings is such that they will not intercept light to any injurious extent, and they constitute a transparent, tough, and flexible back *b*, adhering closely to the negative film. I do not confine myself, however, to the conjoint use of rubber and collodion in making said back, but may use either material alone or any other suitable material which will constitute a sufficiently transparent, tough, and flexible back, whereby the negative film may be safely lifted and removed from the glass. The glass, with the coated negative thereon, is then immersed in a bath of acetic acid, which loosens the negative film from the glass. The film and its lifting-back are then stripped from the glass, and the then uncovered side of the negative is secured, by gum-arabic or other suitable transparent cement, to a sheet of oiled silk, which is held in a smooth and flat condition by any suitable means. The oiled silk constitutes a facing for the negative, which is at once tough, strong, and flexible, and enables the negative to conform to surfaces having a greater or less curvature. The negative thus protected is particularly adapted for use in photographically applying characters and lines to watch-dials by the process described in another application for Letters Patent filed by me, but may be used for various other purposes to which stripped negatives are applicable. When the negative is used, it should be placed with the oiled silk outward, so that the light will pass through the latter. The back *b* is purposely made as thin as possible, so that the light will not cross between the lines of the negative and the sensitized surface on which it is placed.

I claim—

1. A negative film having a facing of oiled silk, as set forth.

2. A stripped negative film having a lifting coat or back applied to one side and a facing of oiled silk secured to its opposite side, as set forth.

In testimony whereof I have signed my name to this specification, in the presence of two subscribing witnesses, this 14th day of March, 1888.

FRANÇOIS SCHMALZ.

Witnesses:
A. D. HARRISON,
C. F. BROWN.